United States Patent
Ben Khadhra et al.

(10) Patent No.: US 11,567,190 B2
(45) Date of Patent: Jan. 31, 2023

(54) POLARIMETRIC RADAR SYSTEM AND METHOD FOR OBJECT CLASSIFICATION AND ROAD CONDITION ESTIMATION IN STATIONARY APPLICATIONS

(71) Applicant: IEE INTERNATIONAL ELECTRONICS & ENGINEERING S.A., Echternach (LU)

(72) Inventors: Kais Ben Khadhra, Mamer (LU); Oscar Gomez, Paris (FR); Jochen Landwehr, Trier (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 328 days.

(21) Appl. No.: 16/473,514

(22) PCT Filed: Dec. 22, 2017

(86) PCT No.: PCT/EP2017/084446
§ 371 (c)(1),
(2) Date: Jun. 25, 2019

(87) PCT Pub. No.: WO2018/122181
PCT Pub. Date: Jul. 5, 2018

(65) Prior Publication Data
US 2019/0331790 A1    Oct. 31, 2019

(30) Foreign Application Priority Data
Dec. 27, 2016  (LU) .......................... 93 431

(51) Int. Cl.
*G01S 13/91* (2006.01)
*G01S 7/02* (2006.01)
(Continued)

(52) U.S. Cl.
CPC .............. *G01S 13/91* (2013.01); *G01S 7/026* (2013.01); *G01S 13/02* (2013.01); *G01S 13/931* (2013.01);
(Continued)

(58) Field of Classification Search
CPC .......... G01S 13/91; G01S 7/026; G01S 13/02; G01S 13/931
See application file for complete search history.

(56) References Cited

U.S. PATENT DOCUMENTS 6,441,748 B1    8/2002  Takagi et al.
9,460,613 B1   10/2016  Whiting et al.
(Continued)

FOREIGN PATENT DOCUMENTS

CN    101498789 A     8/2009
DE   102015200939 A1  7/2016
(Continued)

OTHER PUBLICATIONS

International Search Report corresponding to International application No. PCT/EP2017/084446, dated Mar. 20, 2018, 4 pages.
(Continued)

*Primary Examiner* — Donald H B Braswell
(74) *Attorney, Agent, or Firm* — Reising Ethington P.C.

(57) ABSTRACT

A polarimetric radar system for object classification and road condition estimation includes a radar transmitter unit for transmitting radar waves of different polarizations, a radar receiving unit for receiving radar waves of different polarizations, a radar signal generating unit for generating and providing the radar waves to be transmitted, a signal processing circuitry for processing the generated and received radar waves, and a signal evaluation unit. The signal evaluation unit receives processed signals from the signal processing circuitry, estimates values for a set of
(Continued)

predetermined object parameters on the basis of the received processed signals, and selects an object class from a plurality of predetermined object classes upon detecting a match of the estimated values with one out of a plurality of predetermined sets of object parameters. The signal evaluation unit is configured to provide information that is indicative of the at least one classified object.

14 Claims, 5 Drawing Sheets

(51) Int. Cl.
*G01S 13/02* (2006.01)
*G01S 13/931* (2020.01)
*H04W 4/02* (2018.01)

(52) U.S. Cl.
CPC ..... *H04W 4/027* (2013.01); *G01S 2013/0254* (2013.01); *G01S 2013/9322* (2020.01)

(56) References Cited

U.S. PATENT DOCUMENTS

| | | | | |
|---|---|---|---|---|
| 2002/0156588 | A1* | 10/2002 | Arndt | G08B 19/02 702/40 |
| 2010/0102991 | A1 | 4/2010 | Hernandez Gonzalez et al. | |
| 2013/0093616 | A1* | 4/2013 | Jeon | G01S 7/414 342/118 |
| 2016/0025839 | A1* | 1/2016 | Trummer | G01S 13/931 342/188 |
| 2016/0306063 | A1* | 10/2016 | Hyde | G01S 7/412 |
| 2017/0316284 | A1* | 11/2017 | Chang | G06V 20/58 |

FOREIGN PATENT DOCUMENTS

| | | |
|---|---|---|
| EP | 0875749 A2 | 11/1998 |
| EP | 0875750 A1 | 11/1998 |
| EP | 2141676 A1 | 1/2010 |
| JP | S55147375 A | 11/1980 |
| WO | WO8502266 A1 | 5/1985 |

OTHER PUBLICATIONS

Written Opinion corresponding to International application No. PCT/EP2017/084446, dated Mar. 20, 2018, 7 pages.

M. W. Boerner, "Basic Concepts in Radar Polarimetry", UIC-ECE Communications, Sensing & Navigation Laboratory, 100 pages.

Office Action from counterpart CN application No. 101498789A dated Oct. 9, 2022, 32 pages.

* cited by examiner

POLARIMETRIC RADAR SYSTEM AND METHOD FOR OBJECT CLASSIFICATION AND ROAD CONDITION ESTIMATION IN STATIONARY APPLICATIONS

TECHNICAL FIELD

The invention relates to a polarimetric radar system for object classification and road condition estimation in stationary road applications and a method of classifying objects and of estimating a condition of a road by using such polarimetric radar system, and a software module for controlling automatic execution of the method.

BACKGROUND OF THE INVENTION

In urban areas, pedestrian crossing zones are known to be potentially hazardous sites in today's traffic. This is especially true for hazy days or during nighttime, even with mounted street lights, or due to bad road conditions, for instance in case of black ice, snow or oil spill.

Therefore, systems have been proposed in the art in order to improve safety at pedestrian crossing zones.

For example, patent application EP 2 141 676 A1 describes a pedestrian crossing with presence detector and warning. The pedestrian crossing constitutes an independent and transportable constructive element, is claimed to be easy to assemble and dismantle, with low maintenance cost, equipped with presence detectors, warning devices, power supply system, accumulators and electronic devices (circuitry, etc.). The pedestrian crossing permits the detection of pedestrians, vehicles, or both, in a crossing zone, and alerts both drivers and pedestrians of their respective presence on said crossing, or in proximity thereto. The pedestrian crossing is further disclosed to be adapted to the particular conditions of each zone, and provided with height regulators, drainage systems and access for disabled persons, and means for the attack of vehicles, which provides greater road safety, reduces the risk of accidents to pedestrians due to inclement weather, reduces acoustic contamination and gives greater versatility to the use of public roads. It also has uses in fixed pedestrian crossings in the form of total or partial introduction of the different elements constituting the invention or in the form, for example, of total or partial shelters for fixed crossings incorporating said elements.

The employed presence detectors may be formed as pressure sensors, capacitive sensors, conducting rubber, photoelectric sensors, optical sensors or laser sensors.

Patent U.S. Pat. No. 9,460,613 B1 describes a method of pedestrian detection and counting for traffic intersection control based on object movement within a field of view. The method analyzes characteristics of a field of view of a traffic detection zone to determine a location and size of a pedestrian area, and applies protocols for evaluating pixel content in the field of view to identify individual pedestrians. An alarm may be triggered based on detected pedestrian incidents. The location and size of a pedestrian area is determined based either on locations of vehicle and bicycle detection areas or on movement of various objects within the field of view. Automatic pedestrian speed calibration with a region of interest for pedestrian detection is accomplished using lane and other intersection markings in the field of view. Detection and counting further includes identifying a presence, volume, velocity and trajectory of pedestrians in the pedestrian area of the traffic detection zone.

Objects are detected by sensors capturing data in the field of view. The employed sensors may be formed as video cameras, thermal cameras, radar systems, magnetometers and acoustic sensors.

Patent U.S. Pat. No. 6,441,748 B1 describes a road surface condition monitoring system using sensors disposed under the road. In the road surface condition monitoring system, at least one sensor unit is interchangeably provided in a sealed container disposed below the road surface. A power source is provided to power the sensor unit, and a communications device is provided to obtain measurement and/or monitoring data from the at least one sensor unit and to provide control signals to the at least one sensor unit, whereby an inexpensive and readily maintainable system is claimed to be provided. The sensor unit may comprise a laser radar sensor, a moisture load sensor, an optical sensor, a radiometer sensor, an ultrasonic snow depth sensor, a thermometer, a rain gauge, etc. These sensors are used to measure and monitor such conditions as presence or absence of rain, moisture, dryness, snow, snow depth, ice, ice depth, etc.

SUMMARY

It is desirable to provide a system and method for effective and reliable object classification and road condition estimation. It is therefore an object of the invention to provide a system and method that is capable of effective and reliable object classification and road condition estimation in stationary applications for generating improved traffic safety.

To achieve this object, it has been found that polarimetric radar devices and existing methods of radar polarimetry can beneficially be employed for object classification and road condition estimation.

Radar polarimetry deals with measuring the polarization state of a radar frequency electromagnetic wave when the electromagnetic wave is re-polarized after it hits a radar target or a scattering surface, and is reflected. In radar polarimetry, the polarization state of radar waves under scattering conditions is usually described by formalisms including complex matrices.

Formally, the incident radar wave can be described by a two-component vector, wherein the vector components represent complex electric fields in a horizontal ($E_h^i$) and a vertical direction ($E_v^i$), respectively. The reflected or scattered radar wave can be described by another two-component vector with vector components representing complex electric fields in the horizontal ($E_h^s$) and the vertical direction ($E_v^s$). In this way, each scattering object is considered a polarization transformer, and the transformation from a transmitted wave vector to a received wave vector can be described as applying a matrix called scattering matrix to the vector representing the incident radar wave.

$$\begin{bmatrix} E_h^s \\ E_v^s \end{bmatrix} = \begin{bmatrix} S_{hh} S_{hv} \\ S_{vh} S_{vv} \end{bmatrix} \cdot \begin{bmatrix} E_h^i \\ E_v^i \end{bmatrix}$$

The diagonal matrix elements are usually called copolarized, the non-diagonal elements are called cross-polarized. This matrix contains all the information about the scattering process and the scatterer itself. Elements of the scattering matrix or an equivalent matrix, for instance the known Covariance matrix and the Coherency matrix, are observable power terms. Different relevant matrix formalisms exist and are used in radar polarimetry, such as Jones Matrix, S-matrix, Müller M-matrix and Kennaugh K-matrix. By measuring the scattering matrix or an equivalent, the strength and polarization of the scattered radar wave for an arbitrary polarization of the incident wave can be computed.

An outline of mathematical methods of treating scattering matrices and of extracting the information contained in a measured scattering matrix of observed power terms can be found, for instance, in Wolfgang-Martin Boerner, "Basic Concepts in Radar Polarimetry", PoISARpro v3.0—Lecture Notes (available at http://earth.esa.int/landtraining07/polsar_basic_concepts.pdf). This document shall hereby be incorporated by reference in its entirety with effect for the jurisdictions permitting incorporation by reference.

The invention is particularly beneficial if applied to a pedestrian crossing zone that forms part of the road. Other stationary road applications are also contemplated, for example the use for a section of a road that is located outside city limits and is known to be a site of deer crossing.

In one aspect of the present invention, the object is achieved by a polarimetric radar system that is configured for object classification and road condition estimation in stationary road applications.

The phrases "configured for" and "configured to", as used in this application, shall in particular be understood as being specifically programmed, laid out, furnished or arranged. The term "road", as used in this application, shall in particular be understood to encompass a paved thoroughfare on land that allows traveling by foot, bicycle or any motor vehicle and is located either outside city limits or in an urban environment (than commonly also referred to as "street").

The polarimetric radar system comprises at least one radar transmitter unit, at least one radar receiving unit, a radar signal generating unit, a signal processing circuitry and a signal evaluation unit.

The at least one radar transmitter unit is configured for transmitting radar waves of at least two different polarizations. The at least one radar receiving unit is configured for receiving radar waves of at least two different polarizations. The radar signal generating unit is configured to generate and to provide radar waves to be transmitted by the at least one radar transmitter unit. The signal processing circuitry is configured for processing the generated radar waves to be transmitted and the received radar waves.

The signal evaluation unit is configured to receive processed signals from the signal processing circuitry and to estimate values for a set of predetermined object parameters on the basis of the received processed signals. The signal evaluation unit is further configured to select an object class that corresponds to a specific predetermined set of object parameters out of a plurality of predetermined sets of object parameters from a plurality of predetermined object classes upon detecting a match of the estimated values for the set of object parameters with the specific predetermined set of object parameters. Moreover, the signal evaluation unit is configured to provide an information that is indicative of the at least one classified object.

The term "received radar waves", as used in this application, shall particularly be understood as radar waves that are generated from transmitted radar waves by being reflected or scattered by objects. This can, for instance, be ensured by an appropriate arrangement of the at least one radar transmitter unit and the at least one radar receiving unit.

The term "object parameter", as used in this application, shall particularly be understood as a parameter that is characteristic for a specific object, and by that, can serve to distinguish the specific object from other objects. Examples of object parameters include, but are not limited to, size, velocity along the line of sight, the range, the angle of arrival, and electric properties such as permittivity.

The transmitted radar waves are understood to be transmitted in a direction towards a portion of the ground that surrounds the polarimetric radar system, where objects that might reflect or scatter the transmitted radar waves can be expected.

In this way, a radar system for object classification and road condition estimation in stationary applications can be provided which shows a low number of false negative classification results and a low number of false positive classification results. The provided information that is indicative of the at least one classified object can beneficially be used for sending out warnings in order to improve safety.

The polarimetric radar system is in particular advantageous in a stationary application formed as a pedestrian crossing zone that forms part of a road. In this case, the at least one radar transmitter unit is configured to transmit radar waves onto at least a major part of the pedestrian crossing zone. The information that is indicative of the at least one classified object and that is provided by the signal evaluation unit may be used for sending a warning signal to road users such as pedestrians and/or vehicle drivers to inform about their presence in the pedestrian crossing zone in order to avoid accidents between traffic participants.

The classification may comprise a group of classes that includes, but is not limited to, "oil spill", "large inanimate obstacle", "black ice", "snow", "animal" (such as cats or dogs), "pedestrian" and "vehicle". In this way, classifying an object encompasses estimating a condition of a road. The term "vehicle", as used in this application, shall particularly be understood to encompass passenger cars, trucks and buses.

Preferably, a predetermined set of object parameters comprises a predetermined range for each parameter of the set of object parameters. The term "match", as used in this application, shall particularly be understood such that each estimated value for an object parameter of the set of predetermined object parameters shall lie within the predetermined range for the parameter, for all parameters of the set of object parameters.

Also preferably, the at least one radar transmitter unit is capable of providing continuous-wave (CW) radar energy.

In preferred embodiments, the polarimetric radar system further comprises modulation means for generating frequency-modulated (FM) radar waves (more preferred: frequency-modulated continuous-wave (FMCW)) to be transmitted by the at least one radar transmitter unit, and moreover comprises demodulation means for demodulating the received radar waves. By that, absolute velocity and distance can be added as characteristic and important object parameters to the set of object parameters, thus facilitating improved classifying performance.

Preferably, the generated frequency-modulated radar waves to be transmitted are modulated linear in time. The radar frequency of the at least one radar transmitter unit may, for instance, slew up or down as a sawtooth wave or a triangle wave.

In some embodiments of the polarimetric radar system, the signal evaluation unit includes a microcontroller having at least one processor unit and at least one non-transitory computer-readable medium (digital data memory unit) to which the processor unit has data access. In this way, an automated measurement procedure of classifying objects ahead of a vehicle with the polarimetric radar system can be facilitated.

A fast and undisturbed digital signal processing can be accomplished if the microcontroller further includes analog-to-digital converters that are electrically connected to the radar receiving unit. Such equipped microcontrollers are commercially available nowadays in many variations and at economic prices.

In some embodiments of the polarimetric radar system, the at least one radar transmitter unit comprises at least one stationary transmitting antenna that is arrangeable at a road, and the at least one radar receiving unit comprises at least one stationary receiving antenna that is arrangeable at the road, wherein both the at least one stationary transmitting antenna and the at least one stationary receiving antenna are configured for being directed towards a roadway of the road. In this way, transmission of radar waves towards objects staying or moving within a specified portion of the road and receiving radar waves that are generated from transmitted radar waves by being reflected or scattered by such objects can readily be accomplished.

The at least one stationary transmitting antenna and the at least one stationary receiving antenna may be arranged on opposite sides of the road (bi-static arrangement), but a mono-static arrangement, in which the at least one stationary transmitting antenna and the at least one stationary receiving antenna are located on the same side of the road and close to each other is also contemplated.

Preferably, the signal evaluation unit is configured to select an object class from a plurality of predetermined object classes in real time. The phrase "in real time", as used in this application, shall particularly be understood as a response within specified and predetermined time constraints, which are appropriate for the specific application, such that an optimized reaction, for instance in a situation of a potential accident of the driver of a vehicle and a pedestrian, of any one of the involved parties or both can be facilitated.

In some embodiments of the polarimetric radar system, the at least one radar transmitter unit comprises a plurality of transmitting antennas forming a phased-array of antennas. This allows for applying one of the commonly known digital beam forming techniques to enable distinguishing of and classifying more than one object on the road. In a suitable embodiment of the polarimetric radar system, the phased-array of antennas can be used in combination with an appropriate digital beam forming technique to generate a real-time image of the copolarized ratio of radar power (copolarized:transmitted and received polarizations are the same) derived from the measurement of the radar waves reflected or scattered by an object, of a footprint in the field of view.

In another aspect of the invention, a method of classifying objects and of estimating a condition of a road by using a polarimetric radar system as disclosed herein is provided. The method comprises the following steps:
illuminating at least a major part of a road in a transverse direction with radar waves having at least two different polarizations,
receiving radar waves of at least two different polarizations that are reflected by an object to be classified,
estimating values for a set of predetermined object parameters on the basis of the received radar waves,
comparing the estimated values for a set of predetermined object parameters with a plurality of predetermined sets of object parameters,
upon detecting a match of the estimated values for the set of object parameters with a specific predetermined set out of the plurality of predetermined sets of object parameters, assigning the class corresponding to the specific predetermined set to the object, and
providing an information that is indicative of the classified object.

The benefits described in context with the disclosed polarimetric radar system apply to the method to the full extent. The method is particularly beneficial when used for a pedestrian crossing zone that forms part of the road. Other stationary road applications are also contemplated, for example the use for a section of a road that is located outside city limits and is known to be a site of deer crossing.

Preferably, the step of illuminating at least the major part of a road in a transverse direction comprises illuminating at least the major part of the road in a transverse direction with frequency-modulated continuous radar waves (FMCW) to allow for adding absolute velocity, particularly perpendicular to the line of sight, and distance to the set of object parameters for facilitating improved classifying performance.

Thus, in some embodiments of the method, the step of estimating values for a set of predetermined object parameters includes estimating at least one out of velocity, direction and distance of the object with respect to the road. For instance, this can be achieved by exploiting a frequency content of the received radar waves.

In some embodiments of the method, the step of estimating values for a set of predetermined object parameters includes estimating a permittivity of the object from a copolarized ratio of radar power (copolarized:transmitted and received polarizations are the same) derived from the measurement of the radar waves reflected or scattered by an object.

The permittivity of an object is a complex number. The permittivity is estimated for the specific frequency of the transmitted incident radar wave. In this way, the permittivity can be added to the set of predetermined object parameters, which allows classifying of and distinguishing between various potentially deposited layers on a roadway, such as black ice, water, oil spill, and so forth.

An especial beneficial solution can be accomplished if the step of estimating values for a set of predetermined object parameters includes estimating a permittivity of the object from a copolarized ratio of radar power derived from the measurement of the radar waves reflected by an object in the specular direction. In this direction an incidence angle is equal to a scattering angle, and for all surface scattering models (smooth, medium rough and rough), the copolarized ratio of the scattering coefficients is independent of the target roughness. This can be especially beneficial for distinguishing between a layer of water and a layer of ice that may be deposited on the roadway.

In some embodiments of the method, the step of estimating values for a set of predetermined object parameters includes steps of performing a polarimetric decomposition of a matrix formed by making use of the received radar waves, and identifying at least one object from the polarimetric decomposition.

The polarimetric decomposition is a presentation of the matrix that describes the reflection or scattering of the incident radar waves as a linear sum of basis matrices multiplied with corresponding coefficients to express the matrix as a linear sum of scattering mechanisms.

Many schemes of performing a polarimetric decomposition of a scattering matrix are known in the art and are described in relevant textbooks, and also in the cited reference of Wolfgang-Martin Boerner, "Basic Concepts in Radar Polarimetry". Some polarimetric decompositions are model-based and require a priori knowledge about the nature of the scattering object as an input, and some polarimetric decomposition schemes are not model-based. Both types of polarimetric decomposition schemes are contemplated for use in the method disclosed herein.

It is worth noting that by identifying the objects by performing a polarimetric decomposition of the scattering matrix, an estimate of the traffic situation at the specific road portion under consideration can be provided at the same time.

In yet another aspect of the invention, a software module for controlling automatic execution of steps of an embodiment of the method disclosed herein is provided.

The method steps to be conducted are converted into a program code of the software module, wherein the program code is implementable in a digital data memory unit of the polarimetric radar system; that is, it is stored on the computer-readable medium and is executable by a processor unit of the polarimetric radar system. Preferably, the digital data memory unit and/or processor unit may be a digital data memory unit and/or a processing unit of the signal evaluation unit of the polarimetric radar system. The digital data memory unit and/or the processing unit may, alternatively or supplementary, be another digital data memory unit and/or another processor unit that is especially assigned to execute at least some of the method steps.

The software module can enable a robust and reliable execution of the method in an automatic manner and can allow for a fast modification of method steps.

These and other aspects of the invention will be apparent from and elucidated with reference to the embodiments described hereinafter.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

Figure 1:
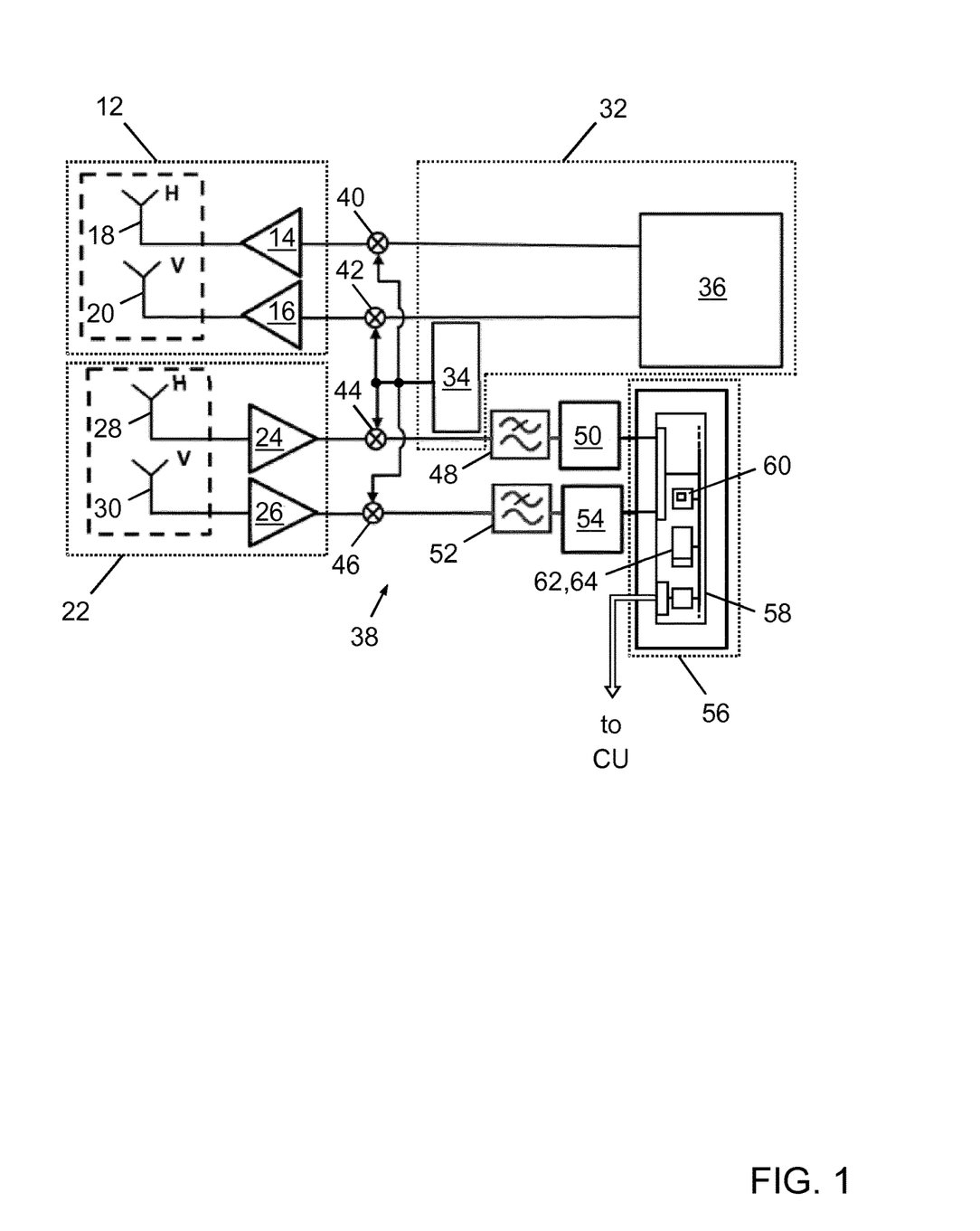
FIG. 1 is a schematic circuit diagram of a polarimetric radar system in accordance with an embodiment of the invention.

FIG. 1 is a schematic circuit diagram of a polarimetric radar system 10 in accordance with an embodiment of the invention, for object classification and road condition estimation in stationary road applications. The polarimetric radar system 10 includes:
a radar transmitter unit 12,
a radar receiving unit 22,
a radar signal generating unit 32,
a signal processing circuitry 38, and
a signal evaluation unit 56.

Figure 2:
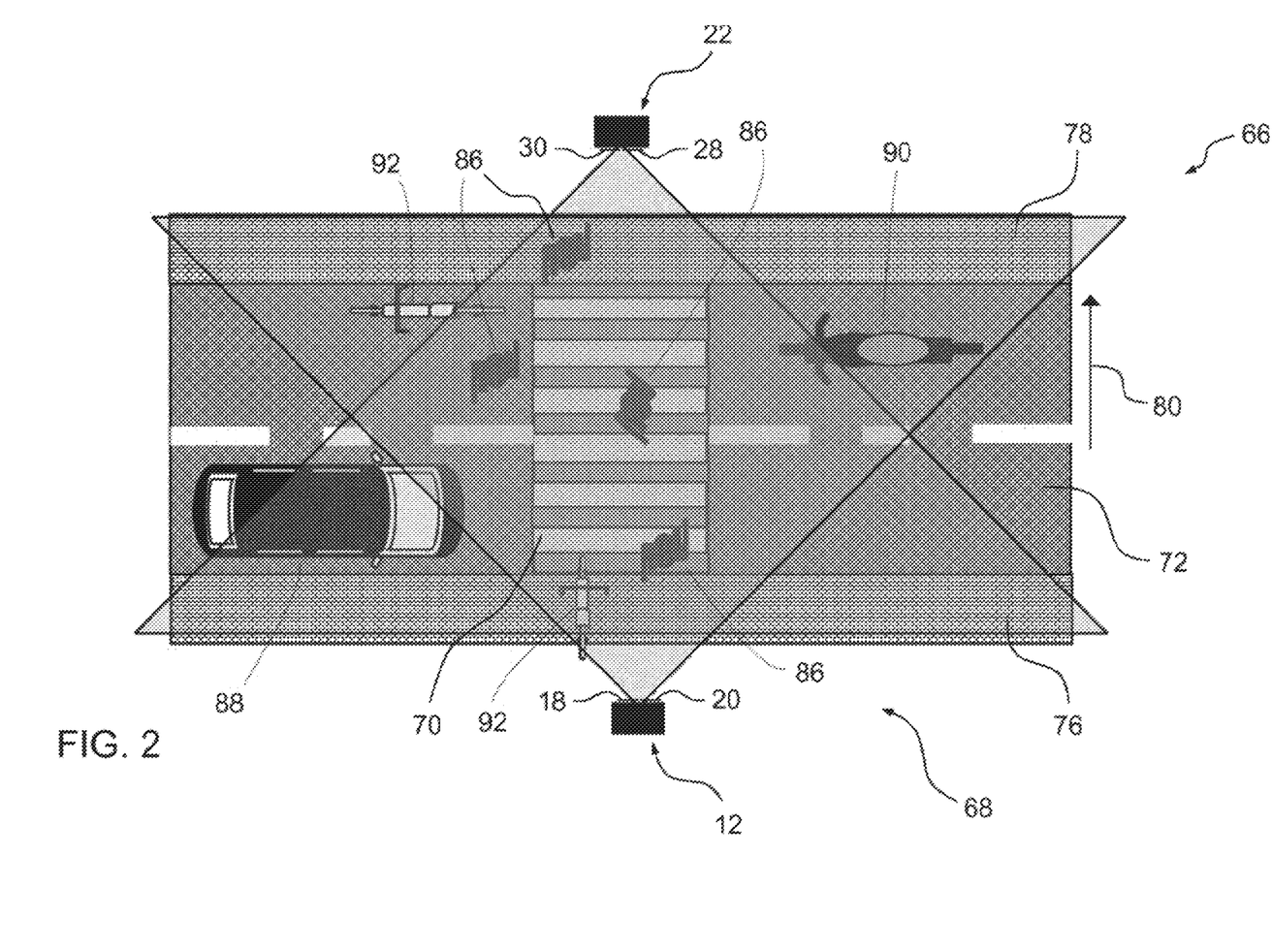
FIG. 2 schematically shows the polarimetric radar system pursuant to FIG. 1 being installed at and forming part of a pedestrian crossing zone that forms part of an urban road, in a top view.
Figure 3:
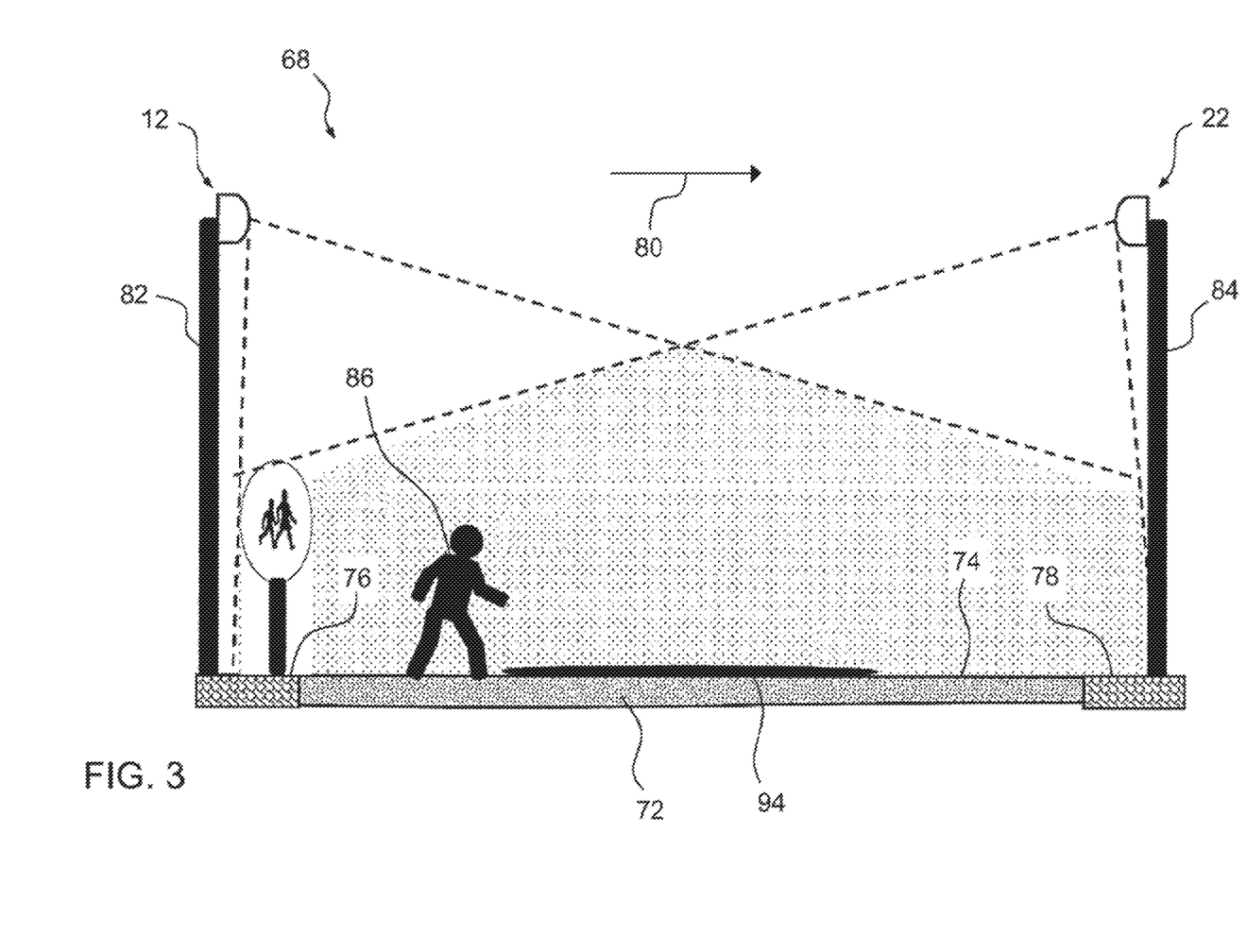
FIG. 3 schematically shows the polarimetric radar system pursuant to FIG. 2 in the installed state in a side view.

The polarimetric radar system 10 is installed in and forms part of a pedestrian crossing zone 68 that forms part of a road 66, as illustrated in FIG. 2 (top view) and FIG. 3 (side view). The road 66 is located within an urban environment and comprises a roadway 72 having one lane for each direction for bicycles 92 and motor vehicles such as cars 88 and motorcycles 90, and a first sidewalk 76 and a second sidewalk 78, one sidewalk 76, 78 adjacent to each one of the two lanes of the roadway 72, for pedestrians 86 to walk on. The pedestrian crossing zone 68 includes a marked crosswalk designed as a zebra crossing 70.

The radar transmitter unit 12 comprises a first power amplifier 14 and a second power amplifier 16 (FIG. 1), which are identically designed, and two transmitting antennas 18, 20 that are designed as patch antennas. A first one 18 of the two transmitting antennas 18, 20 is configured to transmit radar waves with a horizontal polarization. A second one 20 of the two transmitting antennas 18, 20 is configured to transmit radar waves with a vertical polarization. Each one of the power amplifiers 14, 16 is electrically connected with an output port to one of the transmitting antennas 18, 20.

As shown in FIGS. 2 and 3, the two transmitting antennas 18, 20 are arranged at the top of a first pole 82 that is towering above the road 66 and is located at the first sidewalk 76, at the crosswalk 70. The two transmitting antennas 18, 20 are directed towards the roadway 72 and the two sidewalks 76, 78. The radar transmitter unit 12 is therefore configured for transmitting radar waves of horizontal and vertical polarization to a complete width of the road 66 at the crosswalk 70 in a transverse direction 80. As is shown in FIGS. 2 and 3, the radar waves are transmitted such that a roadway surface 74 with potential deposited surface layers 94 such as oil spill, black ice or snow is illuminated by the transmitting antennas 18, 20 as well as objects potentially occurring within a field of view (indicated by full lines in FIG. 2 and dashed lines in FIG. 3) of the transmitting antennas 18, 20, such as pedestrians 86, cars 88, motorcycles 90, bicycles 92 and the like will be.

It is noted herewith that the terms "first", "second", etc. are used in this application for distinction purposes only, and are not meant to indicate or anticipate a sequence or a priority in any way.

Although in this specific embodiment the radar transmitter unit 12 comprises two transmitting antennas 18, 20, it is also contemplated for other embodiments that the radar transmitter unit can comprise a plurality of more than two transmitting antennas forming a phased-array of antennas. Additional hardware needs to be provided in this case, for instance for adjusting a phase relationship between the various antennas, as is well known in the art.

Referring again to FIG. 1, the radar receiving unit 22 comprises a first low-noise amplifier 24 and a second low-noise amplifier 26 and two receiving antennas 28, 30 that are designed as patch antennas. A first one 28 of the receiving antennas 28, 30 is configured to receive radar waves having a horizontal polarization. A second one 30 of the two receiving antennas 28, 30 is configured to receive radar waves with a vertical polarization. Each one of the receiving antennas 28, 30 is electrically connected to an input port of one of the low-noise amplifiers 24, 26.

The two receiving antennas 28, 30 are arranged at the top of a second pole 84 that is towering above the road 66 and is located on the second sidewalk 78, at the crosswalk 70.

The two receiving antennas 28, 30 are directed towards the roadway 72 and the two sidewalks 76, 78. The radar receiving unit 22 is therefore configured for receiving radar waves of horizontal and vertical polarization that are generated from radar waves transmitted by the radar transmitting antennas 18, 20 and that are reflected or scattered by objects 86-94 which are present within a field of view (indicated by full lines in FIG. 2 and dashed lines in FIG. 3) of the transmitting antennas 18, 20. The radar receiving unit 12 is therefore configured for receiving radar waves of horizontal and vertical polarization that are reflected or scattered by objects 86-94 that are present within a complete width of the road 66 at the crosswalk 70 in the transverse direction 80.

Attention is drawn to the fact that the receiving antennas 28, 30 are arranged outside of the field of view of the transmitting antennas 18, 20 in order to prevent direct reception of radar waves transmitted by the transmitting antennas 18, 20.

It is noted that any potential deposited surface layer 94 is treated as an object to be classified in the same way as are the mentioned objects 86-92 potentially occurring in the field of view of the receiving antennas 28, 30, such as pedestrians 86, cars 88, motorcycles 90 and bicycles 92. Those skilled in the art will acknowledge that by classifying an object that is formed by any deposited surface layer 94, a road condition can be estimated.

With reference to FIG. 1, the radar signal generating unit 32 comprises a radar local oscillator 34 and a sweep generator 36. The radar local oscillator 34 is configured to generate radar waves at a radar frequency of, for instance, about 24.0 GHz, and is capable of operating in a continuous wave-mode. The sweep generator 36 is configured to generate a sinusoidal signal of constant amplitude with a linearly varying frequency with a bandwidth of e.g. 200 MHz at a radar frequency of 24 GHz.

The signal processing circuitry 38 is configured for processing the generated radar waves to be transmitted. To this end, the signal processing circuitry 38 comprises a first 40 and a second electronic multiplying frequency mixer 42 that serve as modulation means. The signal from the sweep generator 36 and the signal from the radar local oscillator 34 are electrically connected to the first frequency mixer 40 and to the second frequency mixer 42. An output signal of the first frequency mixer 40 is fed to the first power amplifier 14 of the two power amplifiers 14, 16, which serves to supply the first transmitting antenna 18 with radar power. An output signal of the second frequency mixer 42 is conveyed to the second power amplifier 16, which serves to supply the second transmitting antenna 20 with radar power.

The output signals of the first 40 and the second frequency mixer 42 include a sum and a difference of the frequency of the radar local oscillator 34 and the frequency of the sweep generator 36. The difference frequency signal is eliminated by an appropriate filter (not shown).

In this way, frequency-modulated continuous radar waves can be generated that are to be transmitted via the first transmitting antenna 18 and the second transmitting antenna 20 of the radar transmitter unit 12.

The signal processing circuitry 38 is further configured for processing the received radar waves. To this end, the signal processing circuitry 38 comprises a third 44 and a fourth electronic multiplying frequency mixer 46 that serve as demodulation means. An output port of the first low-noise amplifier 24, which carries a signal of received radar waves with horizontal polarization, and the radar local oscillator 34 are electrically connected to the third frequency mixer 44 of the signal processing circuitry 38. An output port of the second low-noise amplifier 26, which carries a signal of received radar waves with vertical polarization, and the radar local oscillator 34 are electrically connected to the fourth frequency mixer 46 of the signal processing circuitry 38.

The output signals of the third 44 and the fourth frequency mixer 46 include a sum and a difference of the frequency of the radar waves transmitted by the transmitting antennas 18, 20 and the frequency of the radar local oscillator 34. The sum frequency signal is eliminated from the output signal of the third frequency mixer 44 by a subsequent low-pass filter 48 of the signal processing circuitry 38, and only the difference signal is digitally converted by an analog-to-digital converter (ADC) 50. The output signal of the fourth frequency mixer 46 is processed by another low-pass filter 52 and digitally converted by another ADC 54 in the same manner.

The filtered and digitally converted output signals are fed to input ports of the signal evaluation unit 56 that is configured to receive processed signals from the signal processing circuitry 38. The signal evaluation unit 56 includes a microcontroller 58 having a processor unit 60 and a digital data memory unit (non-transitory computer-readable medium) 62 to which the processor unit 60 has data access. In FIG. 1, the signal evaluation unit 56 and the ADCs 50, 54 are shown as separate units. Actually, the ADCs 50, 54 may be integral parts of the microcontroller 58.

As will be described in more detail hereinafter, the signal evaluation unit 56 is configured to estimate values for a set of predetermined object parameters on the basis of the received processed signals. The signal evaluation unit 56 is further configured to select an object class that corresponds to a specific predetermined set of object parameters out of a plurality of predetermined sets of object parameters from a plurality of predetermined object classes upon detecting a match of the estimated values for the set of object parameters with the specific predetermined set of object parameters out of the plurality of predetermined sets of object parameters. The microcontroller 58 is configured to select the object class in real-time.

In this specific embodiment, the plurality of predetermined object classes includes "oil spill", "black ice", "snow", "pedestrian", "car", "motorcycle" and "bicycle". In other embodiments, the plurality of predetermined object classes may include different classes and/or a different number of classifications.

Figure 4:
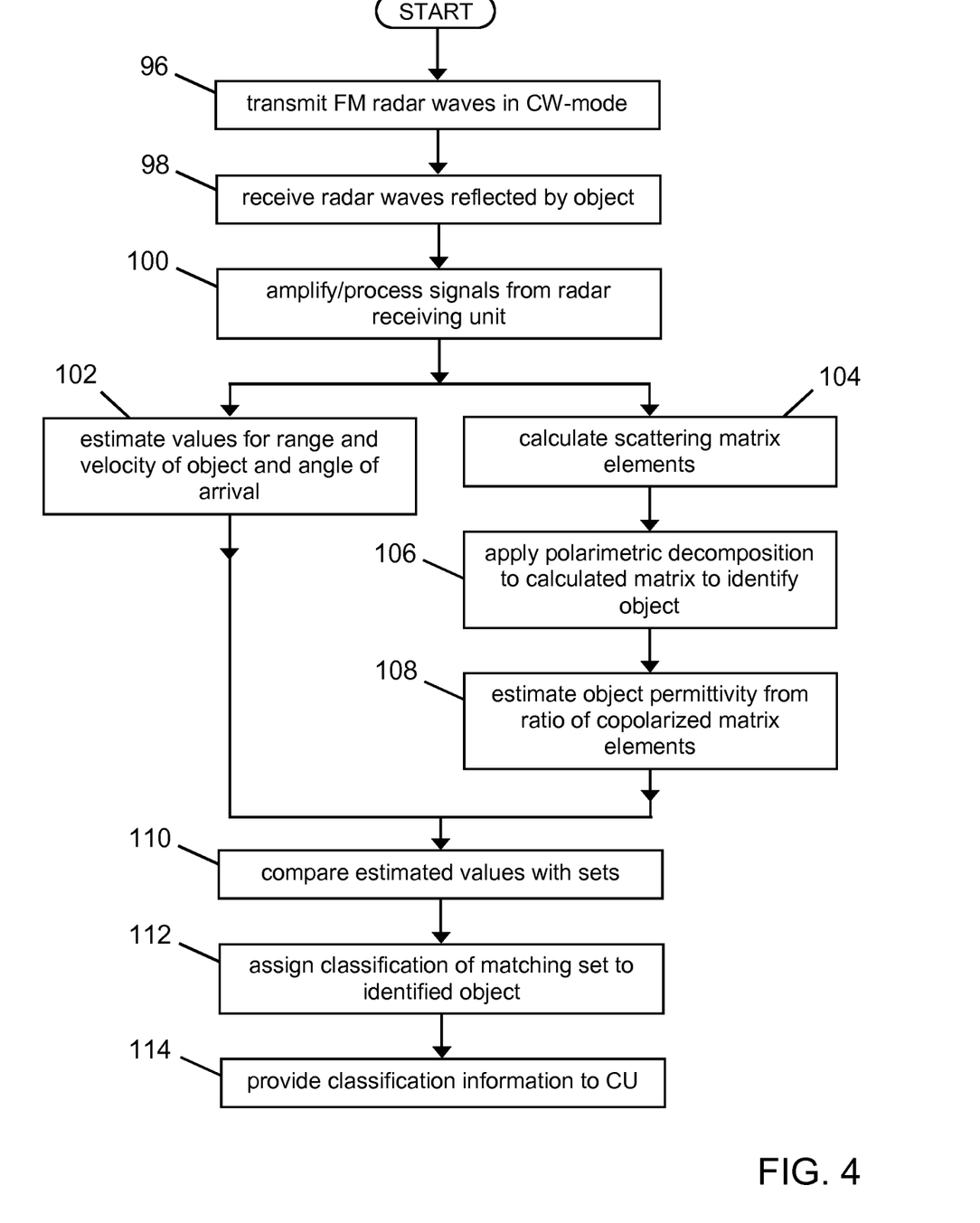
FIG. 4 is a flowchart of an embodiment of a method in accordance with the invention.
Figure 5:
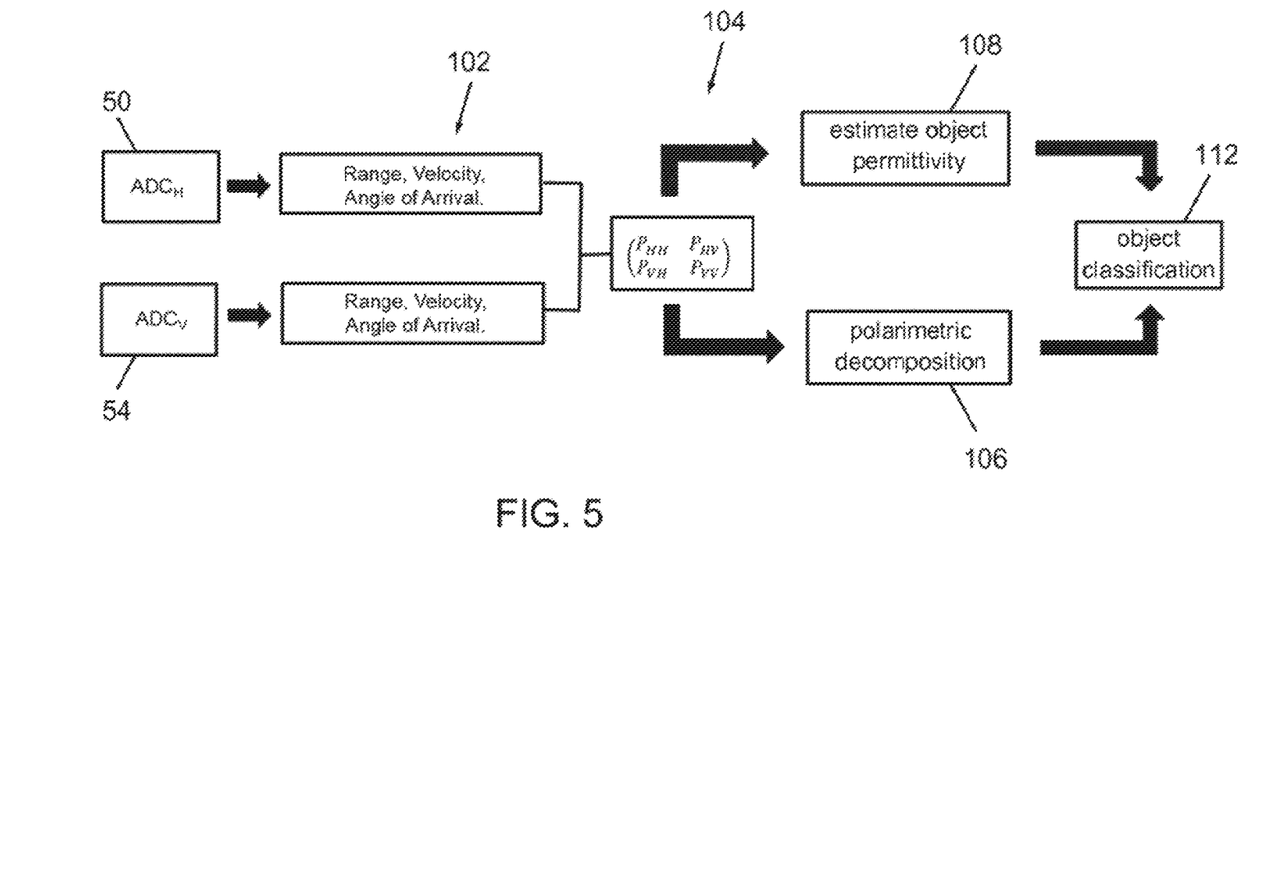
FIG. 5 schematically shows a diagram of evaluating radar waves received by the radar receiving unit of the polarimetric radar system pursuant to FIG. 1.

In the following, an embodiment of a method of classifying objects and of estimating a condition of a road 66 in a stationary road application by using a polarimetric radar system 10 pursuant to FIG. 1 will be described with reference to FIGS. 4 and 5. FIG. 4 provides a flowchart of the method as a whole, whereas a detailed diagram of signal evaluating and object classifying as part of the method is given in FIG. 5. In preparation of operating the polarimetric radar system 10, it shall be understood that all involved units and devices are in an operational state and configured as illustrated in FIGS. 1 to 3.

In order to be able to carry out the method automatically and in a controlled way, the microcontroller 58 comprises a software module 64 (FIG. 1). The method steps to be conducted are converted into a program code of the software module 64. The program code is implemented in the digital data memory unit 62 of the microcontroller 58 and is executable by the processor unit 60 of the microcontroller 58. The software module 64 also includes a subroutine for performing a polarimetric decomposition of a scattering matrix.

Referring now to FIG. 4, as a first step 96 of the method, the complete width of the road 66, in a transverse direction, is illuminated at the pedestrian crossing zone 68 with frequency-modulated radar waves having horizontal polarization and with frequency-modulated radar waves having vertical polarization by simultaneously providing continuous-wave radar power to the two transmitting antennas 18, 20.

Radar waves having horizontal polarization and radar waves having vertical polarization that are reflected by objects 86-94 to be classified are received by the radar receiving unit 22 in another step 98, and the generated signals are amplified and signal-processed by the signal processing circuitry 38 as described above, in the following step 100.

In the next step 102 of the method, values for a set of predetermined object parameters are estimated on the basis of the received radar waves. The set of predetermined object parameters comprises a distance between the objects 86-94 and a predetermined reference point of the pedestrian crossing zone 68 (range), the velocity of the objects 86-94 relative to the pedestrian crossing zone 68 and an angle of arrival of the radar waves reflected by the objects 86-94 to be classified.

In another step 104 of the method, elements of a scattering matrix are calculated on the basis of the received radar waves. The matrix contains all the information about the reflection process and the objects 86-94 and comprises elements of copolarized radar power (co-polarized: transmitted and received polarizations are the same) derived from the measurement of the radar waves reflected by the objects 86-94.

In another step 106 of estimating values for a set of predetermined object parameters, the subroutine for performing a polarimetric decomposition is applied to the calculated matrix, and the objects 86-94 are identified from the polarimetric decomposition.

From a ratio of the elements of copolarized radar power reflected by any one of the objects 86-94, a permittivity of the specific object 86-94 is estimated as a value for another parameter that forms part of the set of predetermined object parameters in another step 108 of estimating values.

In the next step 110 of the method, the estimated values for the set of predetermined object parameters are compared with a plurality of predetermined sets of object parameters. For each object parameter of the set of object parameters, a predetermined range resides in the digital data memory unit 62. The step 102 of comparing includes to check if the estimated value for an object parameter lies within the predetermined range for the object parameter, for all parameters of the set of object parameters. If this condition is fulfilled for a specific predetermined set of object parameters, the estimated values are said to match the specific predetermined set of object parameters.

Upon detecting a match of the estimated values for the set of object parameters with a specific predetermined set out of the plurality of predetermined sets of object parameters, the class corresponding to the specific predetermined set is assigned to the identified object 86-94 in another step 112.

Then, in a further step 114 of the method, an information that is indicative of the classified object 86-94 is provided by the signal evaluation unit 56, for instance to a control unit CU that is configured to control functions of the pedestrian crossing zone 68, to be further used for deciding on sending out optical and/or acoustical warnings by additional, specifically provided devices of the pedestrian crossing zone 68 in order to improve traffic safety.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A polarimetric radar system for object classification and road condition estimation in stationary road applications, the radar system comprising:
 at least one radar transmitter unit arranged in a stationary position above a road and configured to transmit radar waves of at least two different polarizations illuminating a portion of the road surface,
 at least one radar receiving unit that is configured for receiving radar waves of at least two different polarizations,
 a radar signal generating unit that is configured to generate and to provide radar waves to be transmitted by the at least one radar transmitter unit,
 a signal processing circuitry that is configured for processing the generated radar waves to be transmitted and the received radar waves, and
 a signal evaluation unit that is configured:
  to receive processed signals from the signal processing circuitry,
  to estimate a value for a permittivity of an object based on a copolarized ratio of radar power derived from the received processed signals,
  to select an object class that corresponds to a specific permittivity out of a plurality of permittivities from a plurality of predetermined object classes upon detecting a match of the estimated value of permittivity with the specific permittivity, and
  to provide an information that is indicative of the at least one classified object.

2. The polarimetric radar system as claimed in claim 1, wherein the signal evaluation unit is configured to estimate values for a set of predetermined object parameters on the basis of the received processed signals and to select an object class that corresponds to a specific predetermined set of object parameters out of a plurality of predetermined sets of object parameters from a plurality of predetermined object classes upon detecting a match of the estimated values for the set of object parameters with the specific predetermined set of object parameters.

3. The polarimetric radar system as claimed in claim 1, further comprising modulation means for generating frequency-modulated radar waves to be transmitted by the at least one radar transmitter unit, and comprising demodulation means for demodulating the received radar waves.

4. The polarimetric radar system as claimed in claim 1, wherein the signal evaluation unit includes a microcontroller having at least one processor unit and at least one digital data memory unit to which the processor unit has data access.

5. The polarimetric radar system as claimed in claim 1, wherein the at least one radar transmitter unit comprises at least one stationary transmitting antenna that is arrangeable at the road, and wherein the at least one radar receiving unit comprises at least one stationary receiving antenna that is arrangeable at the road, wherein both the at least one stationary transmitting antenna and the at least one stationary receiving antenna are configured for being directed towards a roadway of the road.

6. The polarimetric radar system as claimed in claim 1, wherein the signal evaluation unit is configured to select an object class from a plurality of predetermined object classes in real time.

7. The polarimetric radar system as claimed in claim 1, wherein the at least one radar transmitter unit comprises a plurality of transmitting antennas forming a phased-array of antennas.

8. A pedestrian crossing zone comprising a polarimetric radar system as claimed in claim 1.

9. A method of classifying objects and of estimating a condition of the road by using the polarimetric radar system as claimed in claim 1, the method comprising steps of:
  illuminating at least a major part, in a transverse direction, of a road with radar waves having at least two different polarizations,
  receiving radar waves of at least two different polarizations that are reflected by an object to be classified,
  estimating values for a set of predetermined object parameters on the basis of the received radar waves,
  comparing the estimated values for a set of predetermined object parameters with a plurality of predetermined sets of object parameters,
  upon detecting a match of the estimated values for the set of object parameters, including the permittivity of the object, with a specific predetermined set out of the plurality of predetermined sets of object parameters, assigning the class corresponding to the specific predetermined set to the object, and
  providing an information that is indicative of the classified object.

10. The method as claimed in claim 9, wherein the step of illuminating at least the major part, in a transverse direction, of a road comprises illuminating at least the major part, in a transverse direction, of the road with frequency-modulated continuous radar waves.

11. The method as claimed in claim 9, wherein the step of estimating values for a set of predetermined object parameters includes estimating at least one out of velocity, direction and distance of the object with respect to the road.

12. The method as claimed in claim 9, wherein the step of estimating values for a set of predetermined object parameters includes estimating a permittivity of the object from a copolarized ratio of radar power derived from the measurement of the radar waves reflected or scattered by the object.

13. The method as claimed in claim 9, wherein the step of estimating values for a set of predetermined object parameters includes a step of performing a polarimetric decomposition of a matrix formed by making use of the received radar waves, and identifying at least one object from the polarimetric decomposition.

14. A non-transitory computer-readable medium for controlling automatic execution of the method as claimed in claim 9, wherein the method steps are stored on the computer-readable medium as a program code wherein the computer-readable medium comprises a part of the polarimetric radar system or a separate control unit and the program code is executable by a processor unit of the polarimetric radar system or a separate control unit.

\* \* \* \* \*